Sept. 6, 1932.    V. WILLOUGHBY    1,876,187
ARTICULATED CAR
Filed Jan. 3, 1931    4 Sheets-Sheet 1
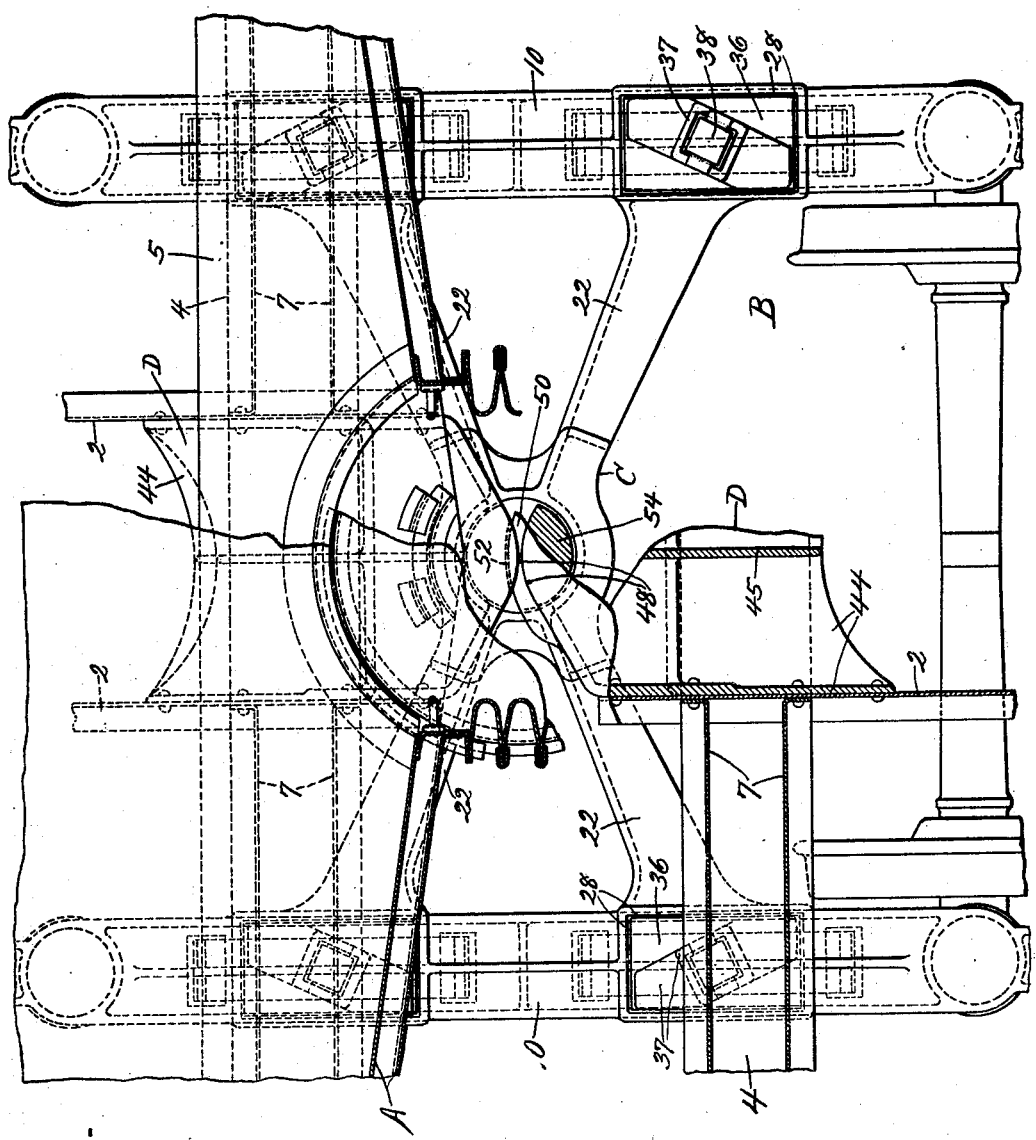
INVENTOR
Victor Willoughby
BY F. H. Gibbs
ATTORNEY

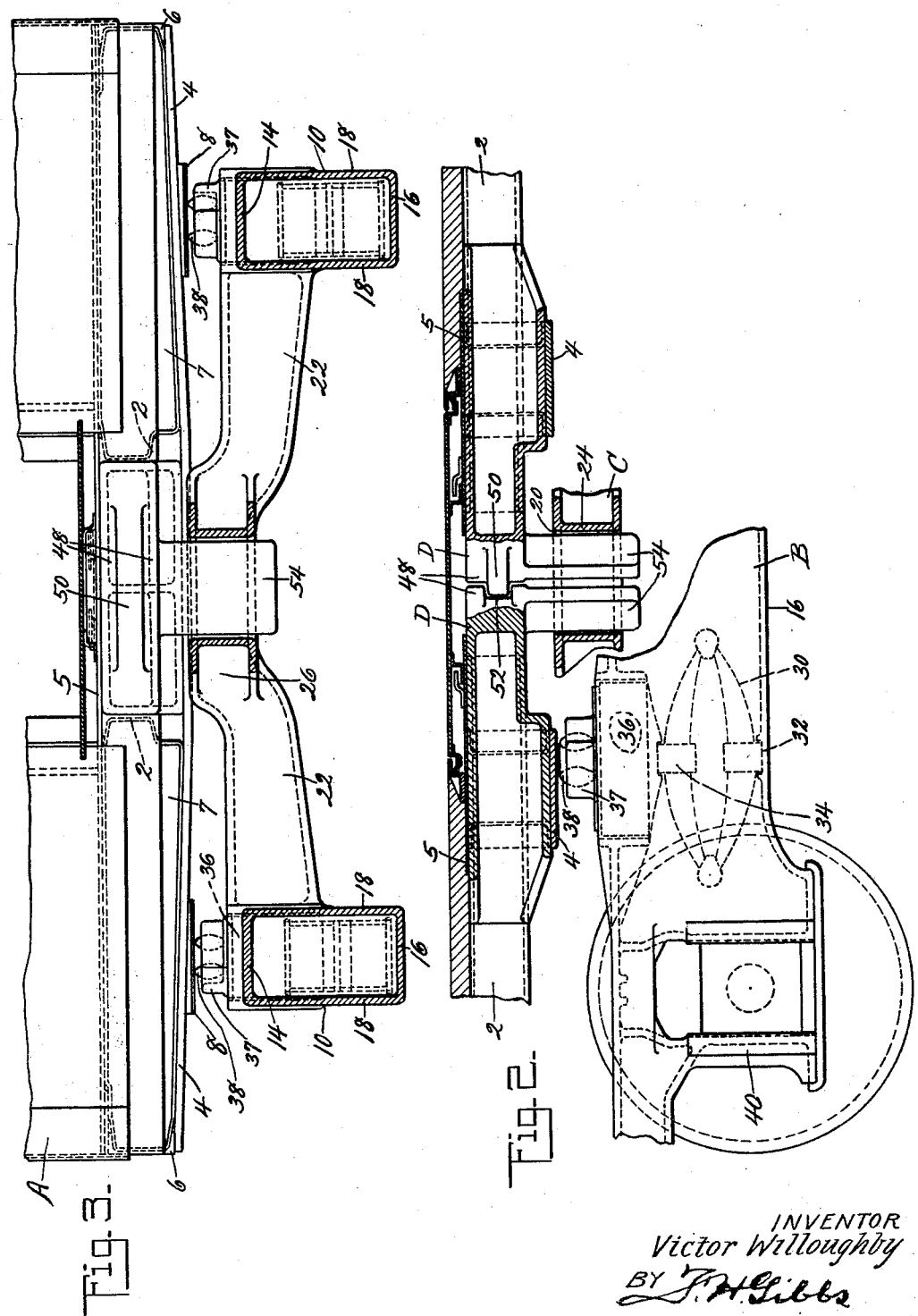

Sept. 6, 1932.  V. WILLOUGHBY  1,876,187
ARTICULATED CAR
Filed Jan. 3, 1931   4 Sheets-Sheet 3
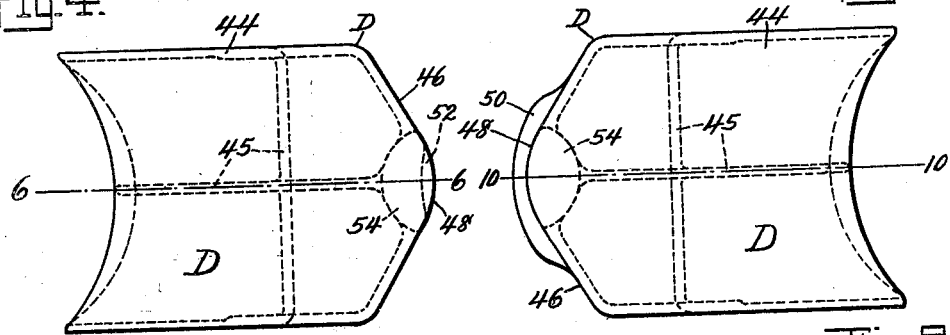
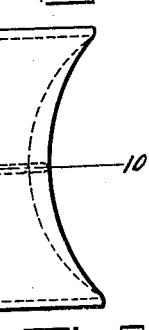
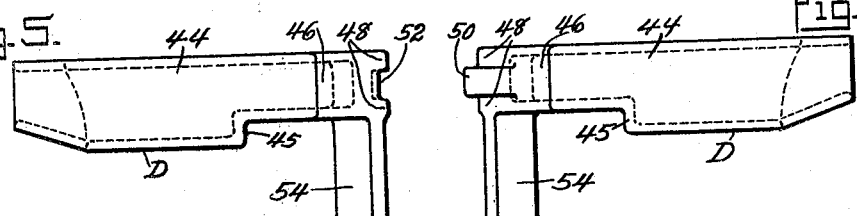
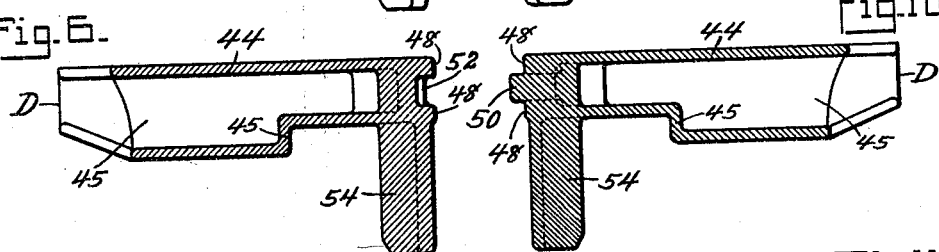
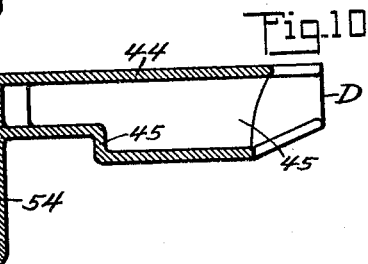
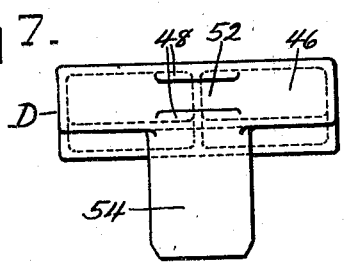
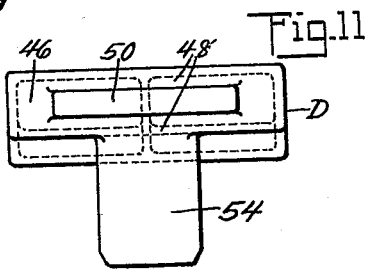
INVENTOR
Victor Willoughby
BY J. H. Gibbs
ATTORNEY Sept. 6, 1932.  V. WILLOUGHBY  1,876,187
ARTICULATED CAR
Filed Jan. 3, 1931  4 Sheets-Sheet 4
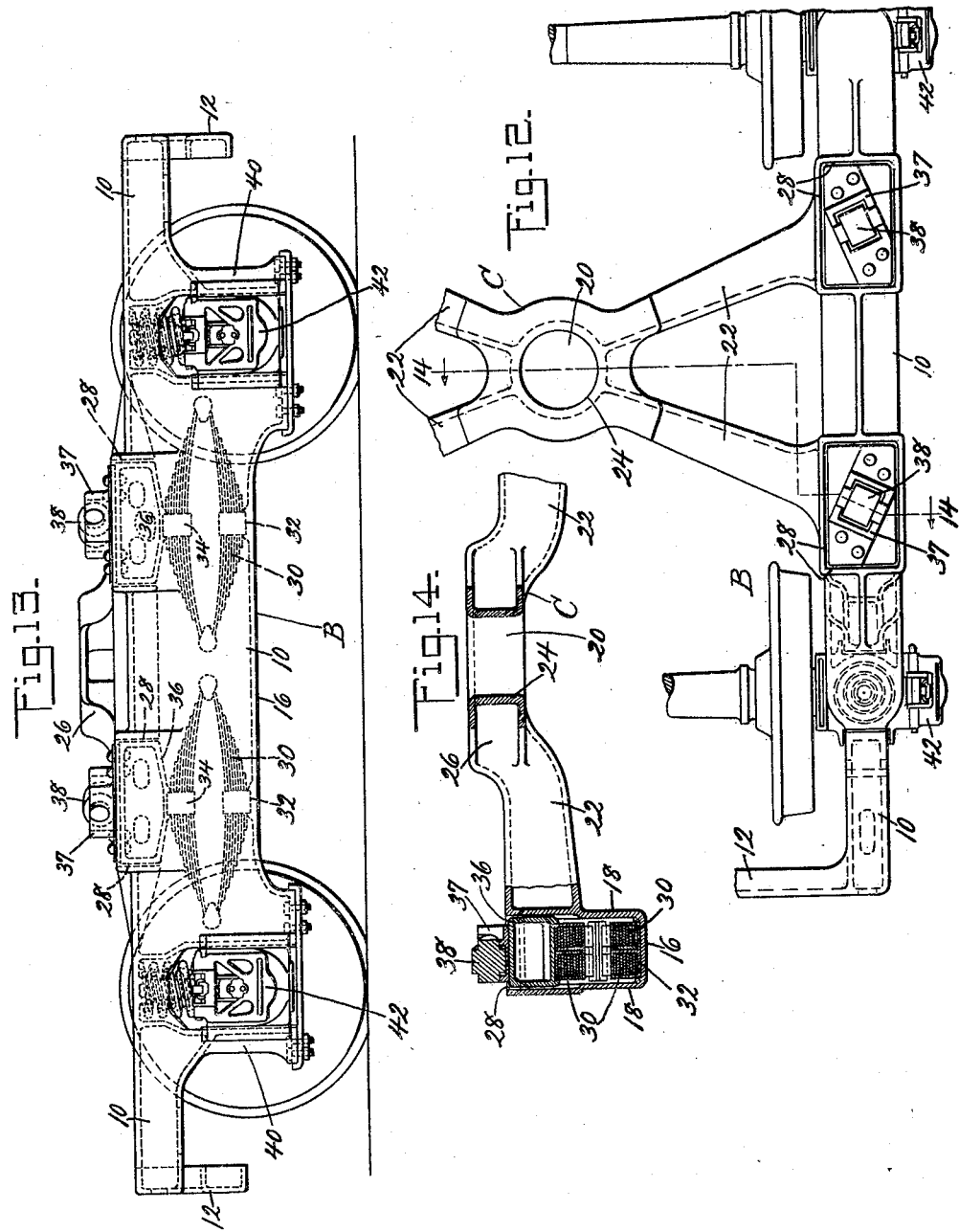
INVENTOR
Victor Willoughby
BY  F H Gibbs
ATTORNEY Patented Sept. 6, 1932

1,876,187

UNITED STATES PATENT OFFICE

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY

ARTICULATED CAR

Application filed January 3, 1931. Serial No. 506,343.

This invention relates to articulated cars of the type in which a single truck, known in the art as a pivot truck, is arranged beneath and supports the adjacent end portions of two car bodies.

Heretofore in the art, articulated cars have been constructed in a manner such that the adjacent end portions of two car bodies are connected to a pivot truck by means of connected body and truck bearings; the bodies swiveling in the truck bearings. The connected bearings serve to transmit a portion of the pulling stresses from the bodies to the truck. The present invention however dispenses with the use of connected body and truck bearings of the interengaged type such as heretofore known and contemplates an articulated car comprising a plurality of car bodies which are supported on truck side bearings carried by the side frames of a pivot truck; the connection of the adjacent end portions of said bodies with the truck being accomplished by means of a transverse truck member into which portions of the adjacent ends of the car bodies are extended. This connection of the adjacent end portions of the car bodies with the truck serves to transmit pulling stresses from the bodies to the truck.

One object of this invention is the provision of an articulated car in which the adjacent end portions of two car bodies are supported solely by the side frames of a car truck.

Another object of this invention is the provision of an articulated car comprising a pair of car bodies supported by the side frames of a car truck to permit independent swiveling movement of the bodies in a horizontal plane, together with means for transmitting pulling stresses from the bodies to the truck.

Still another object of this invention is the provision of a cast truck for supporting the adjacent end portions of two car bodies on the side frames of said truck in such a manner that the adjacent end portions of said bodies may shift horizontally on the side frames, the truck and bodies being provided with cooperating elements for retaining the bodies in their proper spaced relation and for preventing relative sidewise shifting of the bodies as well as for transmitting pulling stresses from the bodies to the truck.

A further object of this invention is the provision of a new and improved car truck for an articulated car.

The invention also contemplates the provision of a new and improved body center casting for articulated cars.

Other objects and advantages of this invention will be apparent from the following description taken in conjunction with the accompanying drawings in which:

Fig. 1 is a top plan view showing portions of adjacent car bodies articulated together as contemplated by the present invention, the view having certain parts broken away, other parts shown in section, and still other parts omitted to more fully disclose the invention.

Fig. 2 is a sectional view through the articulated joint of the present invention, the view also showing more or less diagrammatically, a portion of the car truck forming a part of the present invention.

Fig. 3 is a view showing the end portion of one of the car bodies, applied to the car truck, the latter being shown in section.

Fig. 4 is a top plan view of the body connection casting.

Fig. 5 is a side elevation of the casting shown in Fig. 4.

Fig. 6 is a sectional view on the line 6—6, Fig. 4.

Fig. 7 is a front view of the casting shown in Fig. 4.

Fig. 8 is a top plan view of the body connection casting for one of the car bodies, the casting being a companion casting to that shown in Figs. 4 to 7, inclusive.

Fig. 9 is a side elevation of the casting shown in Fig. 8.

Fig. 10 is a sectional view on the line 10—10, Fig. 8.

Fig. 11 is a front view of the casting shown in Fig. 8.

Fig. 12 is a partial top plan view of the truck forming a part of the invention.

Fig. 13 is a side elevation of the truck shown in Fig. 12, and

Fig. 14 is a sectional view on the line 14—14, Fig. 12.

Referring now more particularly to the drawings in which similar characters of reference designate similar parts in the several views, the present invention is adapted to provide for articulating two car bodies, the end portion of one of which is shown fragmentarily in Fig. 1 at A. The specific construction of the car bodies forms no part of the present invention and hence is not shown in detail, other than those parts necessary to an understanding of this invention. As is usual, the bodies are provided with underframes which include center sills; the latter, in the present instance comprising spaced channels 2. Adjacent each end of the bodies the underframe comprises an end cross bearer including a transverse plate member 4 secured to and extending between the side sills 6 (see Fig. 3) and passing under the center sill. The cross bearer also includes the spaced diaphragm 7 connected to and extending between the side sills 6 and the channels 2 and a top cover plate 5. Secured to the lower surfaces of the plate members 4 intermediate the channels 2 and side sills 6 are wear plates 8.

The adjacent end portions of the bodies are supported directly by a single truck indicated generally at B arranged therebeneath, the specific construction of which will be presently described. The truck frame of the present invention is in effect, a single unit comprising a casting having side frames 10 connected together at their ends by truck end sills 12. The side frames are tubular and comprise top, bottom and side walls 14, 16 and 18 respectively.

Arranged intermediate the end sills 12 of the truck frame is a transverse truck member indicated generally in Fig. 12 at C having an aperture 20 which is substantially midway between the end sills 12 and the side frames 10. The truck member C, as shown in the drawings is cast integral with the remainder of the truck frame, though obviously it may be formed of independent elements attached to the side frames 10 if desired. In the present instance, the member C comprises oppositely arranged pairs of bars 22 which converge from the side frames and merge with a tubular bearing portion 24 having the before mentioned aperture 20 therein. As shown clearly in Fig. 3 the bars 22 are formed with and extend from the inner side walls 18 of the respective side frames and the ends remote from the side frames are upwardly offset as at 26 where they merge with the bearing portion 24.

The side frames 10 are provided with spaced openings 28 in their top walls 14 arranged adjacent the bars 22 and through which springs 30 may be inserted to rest in spring seats 32 formed on the inner surfaces of the bottom walls 16 of the side frames, as shown clearly in Figs. 2, 13 and 14; the springs having spring slips 34 which support follower blocks 36 arranged in and guided by the openings 28 and having side bearing cages 37 secured thereto which support side bearing elements 38 illustrated in the drawings as rollers. The side bearings are so positioned as to receive and support the adjacent end portions of the car bodies at all times, the wear plates 8 resting on said rollers as clearly shown in Fig. 3. From the description just above it will be apparent that each car body rests upon and is supported by side bearing members carried by the side frames of the car truck B, the springs 30 providing the necessary resiliency to obtain proper mounting and operation of the car bodies.

The truck B forms a part of the present invention and, as before mentioned, is a single unit, the same being an integral casting which includes the side frames 10, end sills 12 and, as shown in Figs. 2 and 13, also includes the integral pedestals 40 which receive journal boxes of any suitable type, indicated at 42.

The bodies are connected to the truck to transmit pulling stresses thereto and to prevent relative sidewise and vertical shifting, and now referring to Figs. 1, 2 and 3 it can be seen that the adjacent end portions of the bodies are each connected to the truck through the transverse member C, the end portions each having connection castings D arranged between and secured to the channels 2 and being arranged so that the forward ends of said castings will substantially abut each other whereby to transmit buffing shocks from one car body to the other; this abutting relation of the castings being clearly indicated in Figs. 1 and 2.

The two castings for the adjacent end portions of the car bodies are quite similar in form and may be termed companion castings. Each of the castings comprises a body portion 44 which is hollow and reinforced by stiffening ribs 45 and said castings each rest upon the plate members 4 of the respective car body underframes (see Fig. 2). Each casting is provided with a front wall shown at 46 which tapers from each side of the casting toward the longitudinal center thereof to define a centrally arranged buffing area 48, the areas 48 on adjacent castings being arranged very close together when the bodies are assembled whereby buffing shocks are transmitted between the bodies. To furnish adequate strength to resist buffing shocks, and also to provide a casting through which pulling stresses may be transmitted from the bodies to the truck, the forward ends of the castings are thickened as shown clearly in Figs. 2, 6 and 10. The respective castings are companions and, when the bodies are assembled are interengaged to prevent relative vertical shifting of the bodies and to transmit excessive load from one body to the other and then the truck, and to accomplish this, one casting is provided with a horizontally arranged shelf or anticlimber member 50 adapted to enter a corresponding groove or recess 52 in the adjacent casting.

Depending from the forward end of each casting and extending into the aperture 20 of the transverse member C is a projection indicated at 54 the rear walls of said projections being curved to conform to the cylindrical wall of the aperture.

From the above description it is believed that the construction of the car of the present invention will be fully apparent to those skilled in the art. In operation, pulling stresses are transmitted to the truck through the connection of the projections 54 with the transverse member C. In passing around curves the two car bodies are permitted to swivel by the movement of the projections 54 in the aperture 20, and, as clearly shown in the drawings the contacting surfaces of the castings D are arcuate in order to provide clearance for swiveling. Obviously a sufficient amount of clearance is necessary between the projections 54 and the bearing portion 24 to permit the car bodies to pass over breaks in track grades and this car has been designed to provide such clearance.

The car bodies are directly and solely supported by side bearings which are resiliently mounted by means of the followers 36 on the springs 30, and it will be apparent that relative movements of the car bodies in opposition to the springs 30 will be permitted to a certain extent and yet the bodies will be maintained in substantially their proper positions as the tendency of the springs 30 is to maintain the respective car body end portions in a horizontal plane.

It will be apparent that relative sidewise shifting of the car bodies is prevented by the engagement of the projections 54 with the bearing 24 and that relative vertical shifting is prevented by the interengagement of the castings D due to the connected tongue and grooves 50 and 52 respectively. By the prevention of relative vertical and sidewise shifting it is not to be inferred that an absolute elimination of relative shifting between the bodies is effected because obviously a certain amount of shifting is necessary to provide an operative construction which will include the necessary flexibility of the respective parts and the parts heretofore described prevent excessive relative sidewise and vertical shifting but permit the necessary amount of such shifting.

An important feature of the present invention is the manner in which loads are transferred from the bodies to the truck. The car bodies are designed as side carrying structures. In the usual construction of articulated car, load is carried from a point substantially midway between the side sills of a car body then to a point between the side frames of the truck and finally to the side frames of the truck. In other words load passes from the car into a bolster or other suitable element from where it is transferred to the side frames of the truck. The present construction transmits the load directly from the car bodies to the side frames of the truck by the body side bearings or plates 8 to the truck side bearings carried by the truck side frames. This construction greatly reduces the number of parts required as will be apparent. In the usual construction having a center plate and two side bearings the center plate carries the load. However, some of the vertical load is also carried on the usual side bearings provided in the usual type of articulated car; this happening particularly when a car is passing around a curve. It is also customary to provide a small amount of space between the car body underframe and the truck side bearings with the result that any swaying of the car causes a hammering action between these two elements. This is eliminated in the design of the present invention, because the body and truck side bearings are always in contact and therefore the articulated car of the present invention will provide smoother riding than those of the prior art.

As can be seen in Fig. 1, the car bodies swivel about a point which is the central point of the articulation; this central point being substantially the center of the aperture 20 in the transverse member C.

The drawings herein illustrate one embodiment of the present invention but it is to be understood that they are for illustrative purposes only and various changes in the form and proportions of the construction may be made within the scope of the appended claims without departing from the spirit of the invention.

What is claimed is:

1. In an articulated car, a truck, a pair of car bodies having their adjacent end portions supported wholly by the truck side frames and means for transmitting pulling stresses from the bodies to the truck comprising a tubular bearing portion supported by the truck and arranged substantially midway between the side frames and end sills and with which the adjacent end portions of the bodies are engaged.

2. In an articulated car, a truck, a pair of car bodies having their adjacent end portions supported wholly by the truck side frames and means for transmitting pulling stresses from the bodies to the truck comprising a tubular bearing portion supported by the truck and arranged substantially midway between the side frames and end sills and with which the adjacent end portions of the bodies are engaged, said bearing portion defining the center of swiveling movement of the bodies.

3. In an articulated car, a truck having a substantially centrally arranged stationary tubular bearing element, a pair of car bodies having their adjacent end portions arranged over the truck and supported wholly by the truck side frames and capable of horizontally shifting relative to the truck, and means extending from the adjacent end portions of the bodies engaged in said bearing element for transmitting pulling stresses from the bodies to the truck, said bearing element defining the center of swiveling movement of the said adjacent end portions.

4. In an articulated car, a pair of car bodies and a truck for supporting the adjacent end portion of said car bodies comprising end sills, side frames, and a transversely arranged truck member extending between and rigidly connected to said side frames, said member having a tubular bearing portion arranged substantially midway between the end sills and side frames and with which the said adjacent end portions of the bodies are connected for pivotal movement.

5. In an articulated car, a truck including side frames and having an integral rigid member extending between and connected to the side frames, a pair of car bodies having adjacent end portions extended over the truck and wholly supported by the truck side frames and means depending from the adjacent ends of said bodies engaged in the said rigid member for transmitting pulling stresses from the bodies to the truck.

6. In an articulated car, a truck, a bearing portion supported by the truck and arranged substantially midway between the side frames and end sills of the truck, a pair of car bodies extended over the truck, resiliently mounted bearing elements carried by the truck side frames and on which the bodies are supported for horizontal shifting, and means extending from the adjacent end portions of the bodies engaged in said bearing portion for transmitting pulling stresses from the bodies to the truck.

7. In an articulated car, a truck, a bearing portion supported by the truck and arranged substantially midway between the side frames and end sills of the truck, a pair of car bodies extended over the truck, resiliently mounted bearing elements carried by the truck side frames and on which the bodies are supported for horizontal shifting, and means extending from the adjacent end portions of the bodies engaged in said bearing portion for transmitting pulling stresses from the bodies to the truck and for preventing excessive relative sidewise shifting of the bodies.

8. In an articulated car, a truck, a pair of car bodies having adjacent end portions extended over the truck and resiliently supported by the truck side frames, said adjacent end portions being interengaged whereby to transmit buffing shocks from one body to the other and for preventing excessive relative vertical shifting of the bodies, and means depending from the adjacent end portions of said bodies engaged with a truck part for transmitting pulling stresses from the bodies to the truck and from one body to the other, said means defining the center of horizontal swiveling of the adjacent end portions of said bodies.

9. In an articulated car, a truck having resiliently mounted supporting elements carried by the truck side frames, a pair of car bodies having adjacent end portions arranged over the truck and supported on said supporting elements and adapted to shift horizontally relative to the truck, a transverse truck member, and center castings at the adjacent end portions of said bodies arranged in substantially abutting relation and extended into a truck part for transmitting pulling stresses from the bodies to the truck.

10. In an articulated car, a truck having resiliently mounted supporting elements carried by the truck side frames, a pair of car bodies having adjacent end portions arranged over the truck and supported on said supporting elements and adapted to shift horizontally relative to the truck, a transverse truck member, and center castings at the adjacent end portions of said bodies extended into a truck part for transmitting pulling stresses from the bodies to the truck.

11. In an articulated car, a truck, a pair of car bodies having their adjacent end portions arranged over the truck and resiliently carried by the truck side frames, a transverse truck member, a bearing portion formed with said transverse member and arranged substantially midway between the truck side frames and end sills, center castings secured to the adjacent end portions of the bodies arranged in interengaged relation to transmit buffing shocks from one body to the other and to prevent excessive relative vertical shifting of the bodies, said castings extending into the transverse truck member whereby pulling stresses are transmitted from the bodies to the truck.

12. In a railway car truck, side frames, end sills, spaced car body supporting elements resiliently supported by the side frames, and a rigid truck member extending between and connected to the side frames, said member having a tubular bearing portion arranged substantially midway between the side frames and end sills.

13. In an articulated car, a truck, a transverse truck member, a pair of car bodies having adjacent end portions supported for horizontal swiveling movement on the truck side frames, and center castings at the adjacent end portions of the bodies extended into the transverse truck member and defining the center of swiveling movement of the bodies.

14. In an articulated car, a truck, a pair of car bodies having their adjacent end portions resting upon and supported wholly by the truck side frames and capable of horizontal swiveling movement thereon, a transverse truck member extending between the side frames, a bearing portion forming a part of said transverse truck member, and interengaged center castings extending from the adjacent end portions of the bodies and engaged with said bearing portion for transmitting pulling stresses from the bodies to the truck and from one body to the other and for preventing excessive relative sidewise shifting of the bodies.

15. In an articulated car, a pair of car bodies and a truck for supporting the end portions of said car bodies comprising end sills, side frames, and a transversely arranged truck member extending between and rigidly connected to said side frames and provided with a tubular bearing portion arranged substantially midway between the end sills and side frames, said bearing portion constituting a pivotal axis, and means on the adjacent end portions of the bodies engaged in said bearing portion to connect the bodies and truck for swiveling movement on said axis.

In witness whereof I have hereunto set my hand.

VICTOR WILLOUGHBY.